United States Patent
Prasad et al.

(10) Patent No.: US 12,519,597 B2
(45) Date of Patent: Jan. 6, 2026

(54) SEMI-STATIC SCHEDULING OF MULTICAST BROADCAST SERVICE TRAFFIC

(71) Applicant: Nokia Technologies Oy, Espoo (FI)

(72) Inventors: Athul Prasad, Naperville, IL (US); David Bhatoolaul, Swindon (GB); Naizheng Zheng, Beijing (CN); David Navrátil, Espoo (FI); Volker Pauli, Munich (DE); Ugur Baran Elmali, Munich (DE)

(73) Assignee: Nokia Technologies Oy, Espoo (FI)

( * ) Notice: Subject to any disclaimer, the term of this patent is extended or adjusted under 35 U.S.C. 154(b) by 327 days.

(21) Appl. No.: 18/256,725

(22) PCT Filed: Jan. 14, 2021

(86) PCT No.: PCT/CN2021/071861
§ 371 (c)(1),
(2) Date: Jun. 9, 2023

(87) PCT Pub. No.: WO2022/151212
PCT Pub. Date: Jul. 21, 2022

(65) Prior Publication Data
US 2024/0106607 A1    Mar. 28, 2024

(51) Int. Cl.
*H04L 5/00* (2006.01)
*H04W 72/121* (2023.01)
(Continued)

(52) U.S. Cl.
CPC .......... *H04L 5/0053* (2013.01); *H04L 5/0091* (2013.01); *H04W 72/121* (2013.01); *H04W 72/23* (2023.01); *H04W 72/30* (2023.01)

(58) Field of Classification Search
CPC ... H04W 72/121; H04W 72/23; H04W 72/30; H04L 5/0053; H04L 5/0091
See application file for complete search history.

(56) References Cited

U.S. PATENT DOCUMENTS 10,476,694 B2   11/2019  Fujishiro et al.
11,695,859 B2 *  7/2023  Basu Mallick ....... H04W 28/06
                                                          370/329
(Continued)

FOREIGN PATENT DOCUMENTS

CN    103688476 A    3/2014
CN    104427626 A    3/2015
(Continued)

OTHER PUBLICATIONS

Office action received for corresponding Japanese Patent Application No. 2023-542716, dated Jul. 30, 2024, 3 pages of office action and 3 pages of summary available.
(Continued)

*Primary Examiner* — Shukri Taha
(74) *Attorney, Agent, or Firm* — McCarter & English, LLP

(57) ABSTRACT

Example embodiments of the present disclosure relate to devices, methods, apparatuses and computer readable storage media for semi-static scheduling of multicast broadcast service traffic. In example embodiments, at least one of enabling, disabling or modification of a semi-persistent scheduling configuration is determined for a group of devices on a bandwidth part for multicast broadcast service traffic. The at least one of enabling, disabling or modification of the semi-persistent scheduling configuration is indicated to the group of devices.

20 Claims, 11 Drawing Sheets

(51) Int. Cl.
*H04W 72/23* (2023.01)
*H04W 72/30* (2023.01)

(56) References Cited

U.S. PATENT DOCUMENTS

| | | |
|---|---|---|
| 2013/0114533 A1 | 5/2013 | Ji et al. |
| 2018/0014284 A1 | 1/2018 | Yi et al. |
| 2019/0110224 A1 | 4/2019 | Yasukawa et al. |
| 2019/0132092 A1 | 5/2019 | Chen et al. |
| 2019/0149380 A1 | 5/2019 | Babaei et al. |
| 2020/0100263 A1 | 3/2020 | Gupta et al. |
| 2020/0178344 A1 | 6/2020 | Shan et al. |
| 2020/0245194 A1 | 7/2020 | Wei et al. |
| 2020/0259896 A1 | 8/2020 | Sachs et al. |
| 2020/0351843 A1* | 11/2020 | Zhou .................. H04L 1/08 |
| 2021/0168772 A1* | 6/2021 | Babaei ............ H04W 72/20 |

FOREIGN PATENT DOCUMENTS

| | | |
|---|---|---|
| CN | 109729590 A | 5/2019 |
| CN | 111147218 A | 5/2020 |
| CN | 111163523 A | 5/2020 |
| CN | 111757388 A | 10/2020 |
| WO | 2016/121671 A1 | 8/2016 |
| WO | 2020/172764 A1 | 9/2020 |
| WO | 2022/082661 A1 | 4/2022 |
| WO | WO-2022109249 A1 * | 5/2022 ........... H04L 5/0055 |

OTHER PUBLICATIONS

"Mechanisms to Support Group Scheduling for RRC_CONNECTED UEs", 3GPP TSG RAN WG1 Meeting #103-e, R1-2008826, Agenda Item: 8.12.1, ZTE, Oct. 26-Nov. 13, 2020, pp. 2-10.

"Discussion on group scheduling mechanism for RRC_CONNECTED UEs in MBS", 3GPP TSG RAN WG1 Meeting #103-e, R1-2007835, Agenda: 8.12.1, CATT, Oct. 26-Nov. 13, 2020, pp. 2-7.

"Group Scheduling Mechanisms to Support 5G Multicast | Broadcast Services for RRC_CONNECTED UEs", 3GPP TSG RAN WG1 Meeting #104-e, R1-2100510, Agenda: 8.12.1, Nokia, Jan. 25-Feb. 5, 2021, pp. 2-17.

Office action received for corresponding Chinese Patent Application No. 202180003594.X, dated Nov. 23, 2024, 10 pages of office action and 8 pages of translation available.

Notice of Allowance received for corresponding European Patent Application No. 21918420.7, dated Feb. 7, 2025, 8 pages.

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; Physical layer procedures for control (Release 16)", 3GPP TS 38.213, V16.3.0, Sep. 2020, pp. 1-179.

"WID revision: NR Multicast and Broadcast Services", 3GPP TSG RAN Meeting #88-e, RP-201038, Agenda: 9.10.8, Huawei, Jun. 29-Jul. 3, 2020, 6 pages.

Alepuz et al., "LTE-Advanced Pro Broadcast Radio Access Network Benchmark", 5G-Xcast, Broadcast and Multicast Communication Enablers for the Fifth-Generation of Wireless Systems, Deliverable D3.1, Version 1.1, Jun. 29, 2018, 140 pages.

"Discussion on PDCCH monitoring reduction during DRX active time", 3GPP TSG RAN WG1 #102-e, R1-2006223, Agenda: 8.7.2, CMCC, Aug. 17-28, 2020, 3 pages.

"Draft Report of 3GPP TSG RAN WG1 #102-e v0.2.0", 3GPP TSG RAN WG1 Meeting #103-e, R1-200xxxx, MCC Support, Oct. 26-Nov. 13, 2020, pp. 1-199.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.2.0, Sep. 2020, pp. 1-141.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

"3rd Generation Partnership Project; Technical Specification Group Radio Access Network; Evolved Universal Terrestrial Radio Access (E-UTRA); Physical layer procedures (Release 16)", 3GPP TS 36.213, V16.3.0, Sep. 2020, pp. 1-577.

"Summary#1 on mechanisms to support group scheduling for RRC_CONNECTED UEs for NR MBS", 3GPP TSG RAN WG1 #103-e, R1-200XXXX, Agenda: 8.12.1, CMCC, Oct. 26-Nov. 13, 2020, pp. 1-31.

International Search Report and Written Opinion received for corresponding Patent Cooperation Treaty Application No. PCT/CN2021/071861, dated Oct. 12, 2021, 9 pages.

"Detailed specifications of the terrestrial radio interfaces of International Mobile Telecommunications—2020 (IMT—2020)", M Series Mobile, radiodetermination, amateur and related satellite services, Recommendation ITU-R M.2150-1, Feb. 2022, 316 pages.

Extended European Search Report received for corresponding European Patent Application No. 21918420.7, dated Sep. 5, 2024, 10 pages.

Office action received for corresponding Chinese Patent Application No. 202180003594.X, dated May 1, 2025, 7 pages of office action and 7 pages of translation available.

* cited by examiner

SEMI-STATIC SCHEDULING OF MULTICAST BROADCAST SERVICE TRAFFIC

RELATED APPLICATION

This application claims priority to PCT Application No. PCT/CN2021/071861 filed Jan. 14, 2021, which is incorporated herein by reference in its entirety.

FIELD

Example embodiments of the present disclosure generally relate to the field of communications, and in particular, to devices, methods, apparatuses and computer readable storage media for semi-static scheduling of multicast broadcast service traffic.

BACKGROUND

As part of a Work Item Description (WID) on the fifth generation (5G)/New Radio (NR), the 3rd Generation Partnership Project (3GPP) is currently defining mechanisms for enabling delivery of multicast and/or broadcast traffic to a multitude of user equipment (UEs). One of the key aims of the WID is to define group scheduling mechanisms that enable the multicast and/or broadcast traffic to be scheduled using common data channel resources while maintaining maximum commonalities with the currently defined unicast scheduling and operation mechanisms. One of the objectives of the WID (even though currently not being considered with high-priority) is to support UEs in idle and inactive modes. It is expected that either as part of the Rel-17 WID or as part of future releases, the idle and inactive UEs would be supported along with UEs in a connected mode. Based on the latest agreement, the broadcast needs to be supported for all RRC states in Rel-17 Multicast Broadcast Service (MBS).

SUMMARY

In general, example embodiments of the present disclosure provide devices, methods, apparatuses and computer readable storage media for semi-static scheduling of multicast broadcast service traffic.

In a first aspect, a device is provided which comprises at least one processor and at least one memory including computer program code. The at least one memory and the computer program code are configured to, with the at least one processor, cause the device to determine at least one of enabling, disabling or modification of a semi-persistent scheduling configuration for a group of devices on a bandwidth part for multicast broadcast service traffic. The device is further caused to indicate, to the group of devices, the at least one of enabling, disabling or modification of the semi-persistent scheduling configuration on the bandwidth part.

In a second aspect, a device is provided which comprises at least one processor and at least one memory including computer program code. The at least one memory and the computer program code are configured to, with the at least one processor, cause the device to determine whether a semi-persistent scheduling configuration is enabled, modified or disabled on a bandwidth part for multicast broadcast service traffic. If it is determined that the semi-persistent scheduling configuration is enabled, the device is further caused to receive, based on the semi-persistent scheduling configuration, the multicast broadcast service traffic on the bandwidth part.

In a third aspect, a method is provided. In the method, at least one of enabling, disabling or modification of a semi-persistent scheduling configuration is determined for a group of devices on a bandwidth part for multicast broadcast service traffic. Then, the at least one of enabling, disabling or modification of the semi-persistent scheduling configuration is indicated to the group of devices.

In a fourth aspect, a method is provided. In the method, it is determined whether a semi-persistent scheduling configuration is enabled, modified or disabled on a bandwidth part for multicast broadcast service traffic. If it is determined that the semi-persistent scheduling configuration is enabled, the multicast broadcast service traffic is received on the bandwidth part based on the semi-persistent scheduling configuration.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
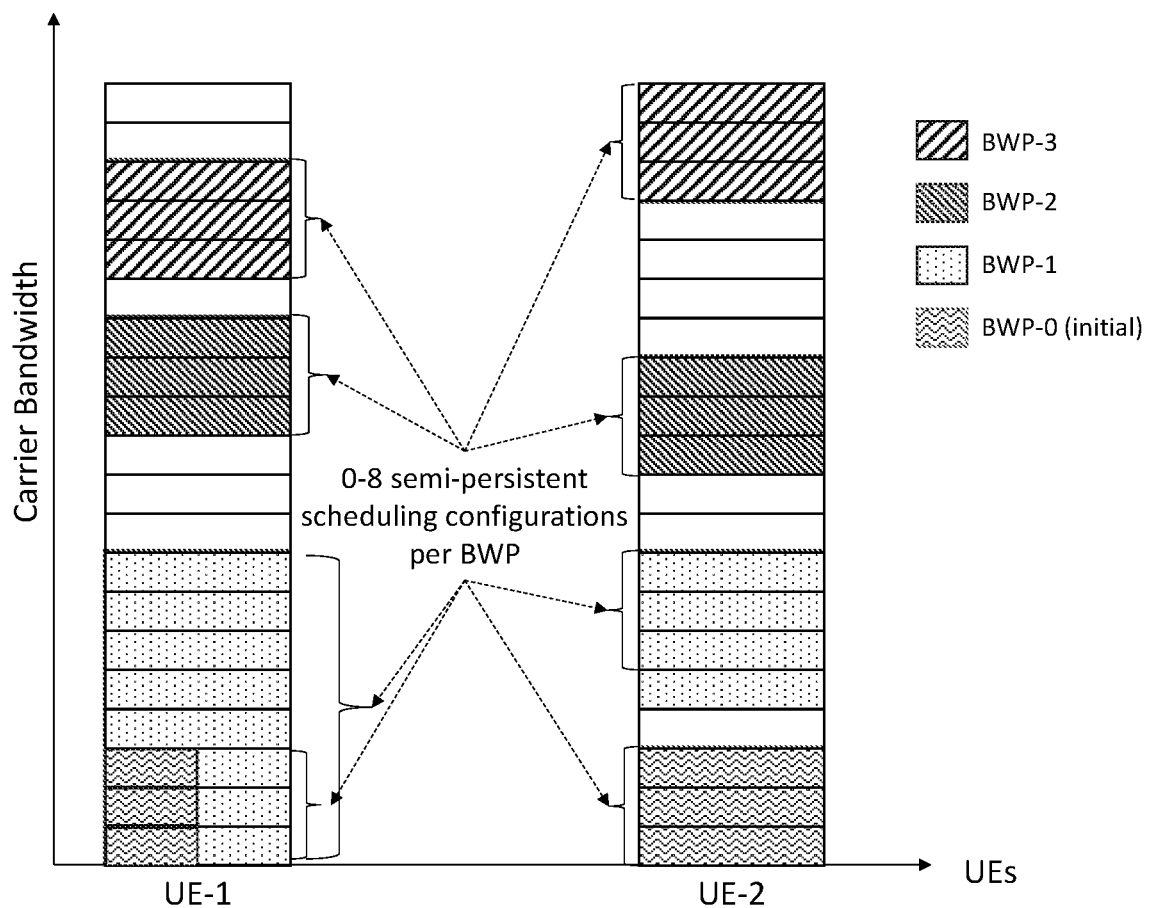
FIG. 1 illustrates SPS configurations for different UEs.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over the air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In the fourth generation (4G), group scheduling mechanisms are enabled using semi-static or dynamic broadcast signalling of control information which points to semi-static or dynamic shared data channel resources for evolved multicast broadcast multimedia service (eMBMS) and single-cell point-to-multipoint (SC-PTM). eMBMS and SC-PTM need to support UEs in a receive-only mode. Accordingly, for eMBMS and SC-PTM, there are a lot of limitations imposed on the system design, for example, to support devices that are not registered with a network, to support devices in an idle mode, or the like. The support for UEs in a receive-only mode has significant impact in terms of sending the multicast data/traffic channel (MTCH) and multicast control channel (MCCH) information using the physical channel, for example, either using a physical downlink shared channel (PDSCH) or a physical multicast channel (PMCH).

It is to be noted that various physical layer scheduling concepts such as bandwidth parts do not exist for Long Term Evolution (LTE), and logical channels such as single-cell multicast control channel (SC-MCCH)/MTCH are not defined for 5G/NR. As a result, it may be impossible to redefine LTE based multicast-broadcast features for 5G. Moreover, Physical Downlink Control Channel (PDCCH) scheduling in 5G/NR is significantly different from that in LTE, which makes it challenging to adapt parameters defined for LTE to be used in 5G.

It is also to be noted that for the delivery of multicast traffic in 5G NR, the current main focus is on UEs in a RRC_Connected mode—which implies that the UE is connected with the network or base station where the UE context information is active. However, as discussed above, for previous generations, unique enhancements have been enabled to facilitate the optimal delivery of multicast traffic. For 5G NR, the enhancements currently being discussed have been mainly related to dynamic downlink data traffic scheduling and radio resource optimizations which are mainly based on currently defined mechanisms for unicast.

There are also various mechanisms related to reliability improvement techniques. Dynamic scheduling, which operates quite similar to unicast scheduling with some enhancements, currently is considered to support both UE-specific type and group-commons type of Physical Downlink Control Channel (PDCCH) signalling. Here, the term "UE-specific" implies that the PDCCH information is scheduled individually for all the UEs interested in receiving MBS traffic, and the term "group-common" implies that the PDCCH information is scheduled for a group of UEs.

Currently, limited attention is provided to semi-static scheduling. Even though the semi-static scheduling is mostly applicable for deterministic traffic, it may provide significant load reductions of the control channel signalling, and eventually power savings. Semi-persistent scheduling (SPS) has been used for unicast in 5G/NR.

FIG. 1 shows SPS configurations for different UEs. As illustrated in FIG. 1, currently 5G/NR supports up to 8 semi-persistent scheduling configurations per bandwidth part (BWP). The configurations mainly include periodicity of scheduling in a data channel such as PDSCH, the number of Hybrid automatic repeat request (HARQ) processes, a Modulation and Coding Scheme (MCS) table to be utilized, HARQ codebook, a PDSCH aggregation factor for data repetition. These configurations are signalled to a UE using RRC signaling, and each configuration is identified using SPS configuration index.

For example, each SPS configuration is enabled using Downlink Control Information (DCI), which is scrambled using configured scheduling radio network temporary identifier (CS-RNTI), with a value of the SPS configuration index embedded within the DCI. Once the UE receives the SPS configurations from the DCI, the UE computes the periodicity.

After a downlink assignment is configured for SPS, the UE may then consider that the Nth downlink assignment occurs in the following slot:

(numberOfSlotsPerFrame×$SFN$+slot number in the frame)=[(numberOfSlotsPerFrame×$SFN_{start\ time}$+slots$_{tarttime}$)+$N$×periodicity×numberOfSlotsPerFrame/10]modulo(1024×numberOfSlotsPerFrame)

Thus, once the SPS configurations are signalled to the UE and activated, the UE would monitor a PDSCH with a configured periodicity and would require no further control signalling from a next generation NodeB (gNB) until the SPS configurations are modified or disabled. This also enables the gNB to configure Discontinuous Reception (DRX) to the UE to avoid unnecessary monitoring of a PDCCH in case there is no modification/disabling signalling that is anticipated, thereby enabling UE power savings.

Some agreements have been made so far on the SPS of MBS. For example, it is agreed to support SPS group-common PDSCH for MBS for RRC_CONNECTED UEs. However, detailed processes are still for further study (FFS). For example, it is FFS whether to use group-common PDCCH or UE-specific PDCCH for SPS group-common PDSCH activation/deactivation, whether to support more than one SPS group-common PDSCH configuration per UE, whether and how to configure uplink feedback, how to retransmit SPS group-common PDSCH, or the like.

The currently defined SPS concept is mainly applicable for unicast traffic without considering MBS traffic. The scheduling of MBS traffic may overlap active BWPs for unicast.

Figure 2:
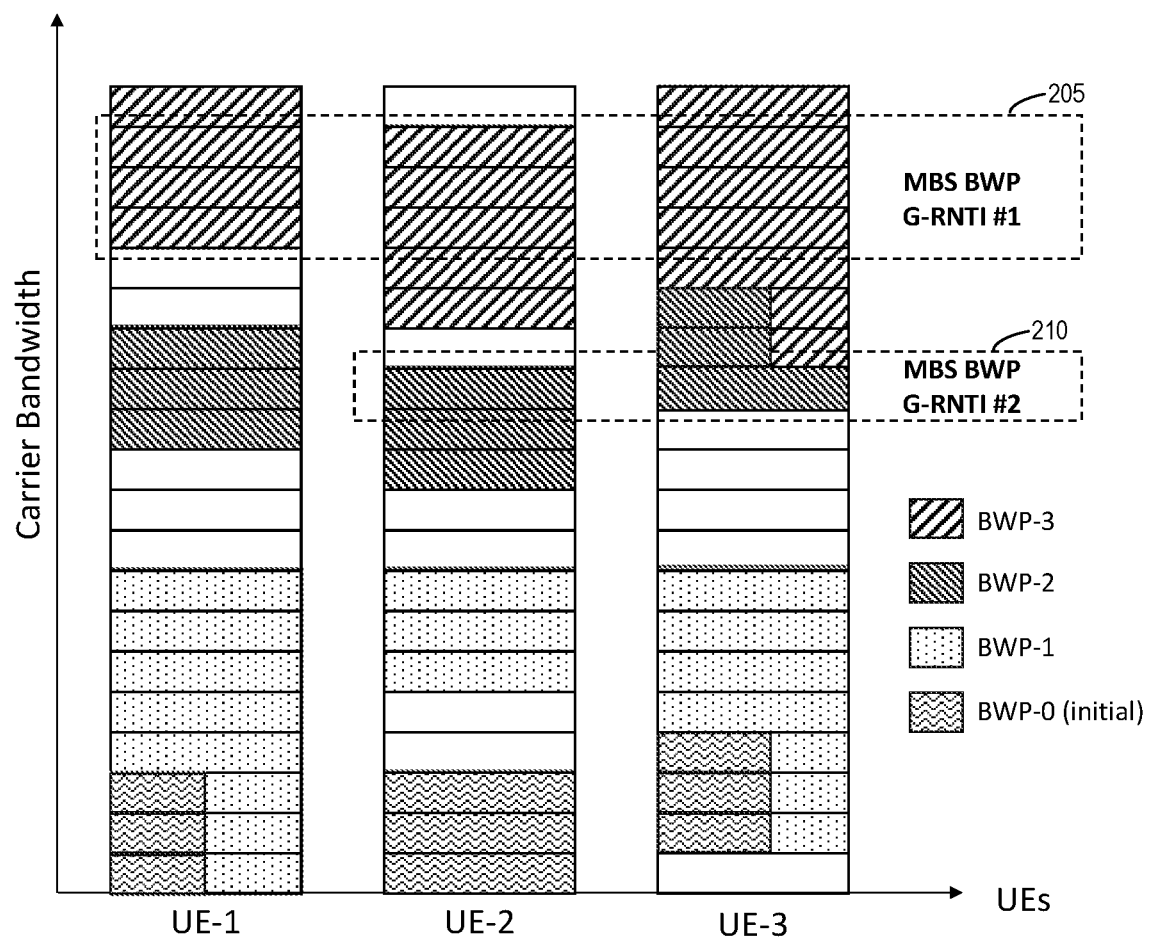
FIG. 2 illustrates example scheduling of MBS traffic across BWPs of multiple UEs.

FIG. 2 shows example scheduling of MBS traffic across BWPs of multiple UEs. As shown in FIG. 2, MBS traffic for the group of UEs (including, UE-1, UE-2 and UE-3, for example) is scheduled BWPs 205 and 210, which, however, is expected to be overlapping active BWPs for unicast to the group of UEs. There might be multiple MBS services scheduled by the gNB for different groups of UEs, and thus it would be challenging to adapt the SPS functionality so that it can be more efficiently used for MBS. Moreover, although BWP concept has been agreed to be used for MBS, different connected-mode UEs would have different active BWP configurations depending on the traffic profiles of the UEs, and frequency domain resources are allocated within the BWP. Accordingly, it would be challenging to broadcast common configurations to connected-mode UEs.

In addition, the DCI for enabling SPS for unicast is scrambled using CS-RNTI. If the SPS configuration is applied for MBS, the PDSCH resources would be multicast and therefore scrambled using Group-RNTI (G-RNTI) or some other cell-specific RNTI. However, there would be no useful way for the UE to differentiate between these two types of scrambling. Furthermore, the SPS concept is mainly defined for connected-mode UEs, and enhancements are required for supporting idle/inactive-mode UEs.

The SC-PTM with SC-MCCH/SC-MTCH configurations is defined in LTE specifications, for example, to be scheduled as part of System Information Block 30 (SIB20). A significant amount of information such as MBS frequency resources, scheduling information, PDCCH configurations, and the like, provided in LTE may not be required in 5G, due to the physical layer enhancements that are natively supported in 5G.

Example embodiments of the present disclosure provide a scheme for signalling semi-persistent scheduling (SPS) information for multicast broadcast service (MBS) traffic, for example, from a network device (such as a gNB) to a group of terminal devices (such as UEs) interested in receiving the traffic. With this scheme, at least one of enabling, disabling or modification of a SPS configuration is determined for a plurality of devices on a bandwidth part (BWP) for MBS traffic and indicated to the plurality of devices. Accordingly, the plurality of devices can determine whether a SPS configuration is enabled, modified or disabled on the BWP. If it is determined that the SPS configuration is enabled, the devices receive the MBS traffic on the BWP based on the SPS configuration.

Here, the bandwidth part may be an active bandwidth part which may be defined as a set of frequency resources. The set of frequency resources is configured for a device or group of devices where the data and control information would be scheduled. The bandwidth part has some predefined characteristics such as numerology, a location of control and data channel resources, semi-static or semi-persistent scheduling configurations—such as periodicity in time domain.

In some example embodiments, an existing SPS configuration made per serving cell and BWP may be reused to be mapped to MBS. In some other example embodiments, a SPS configuration may be determined as part of the G-RNTI configurations. In this way, the SPS configuration may be used for MBS efficiently.

Figure 3:
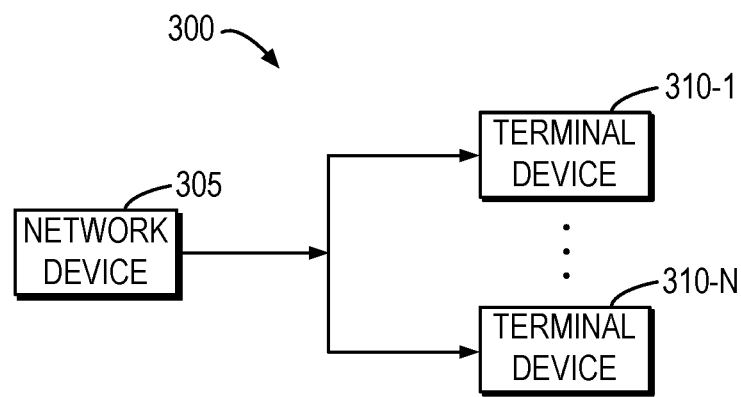
FIG. 3 illustrates an example environment in which example embodiments of the present disclosure can be implemented.

FIG. 3 shows an example environment 300 in which example embodiments of the present disclosure can be implemented.

The environment 300, which may be a part of a communication network, comprises a network device 305 and a group of terminal devices 310-1 . . . 310-N (where N represents any suitable positive integer). For the purpose of discussion, the terminal devices 310-1 . . . 310-N will be collectively or individually referred to as a terminal device 310.

The communications between the terminal devices 310 and the network device 305 and between the terminal devices 310 via the network device 305 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In the environment 300, the network device 105 can transmit MBS traffic to the group of terminal devices 310-1 . . . 310-N semi-persistently (or semi-statically), dynamically or statistically. In some example embodiments, the enabling, disabling or modification of a SPS configuration per BWP for the MBS traffic is indicated by the network device 105 to the terminal devices 310 so that the terminal devices 110 can perform the corresponding operations.

It is to be understood that the network device 105 and the terminal devices 310 are shown to be included in the environment 300 in FIG. 3 only for the purpose of illustration, without suggesting any limitation. In some example embodiments, the MBS traffic may be communicated between a plurality of terminal devices. Accordingly, the enabling, disabling or modification of a SPS configuration per BWP for the MBS traffic may be indicated from a transmitting terminal device to a group of receiving terminal devices. It is also possible that the MBS traffic is transmitted and the corresponding SPS configuration is indicated from a relay to a group of terminal devices.

Figure 4:
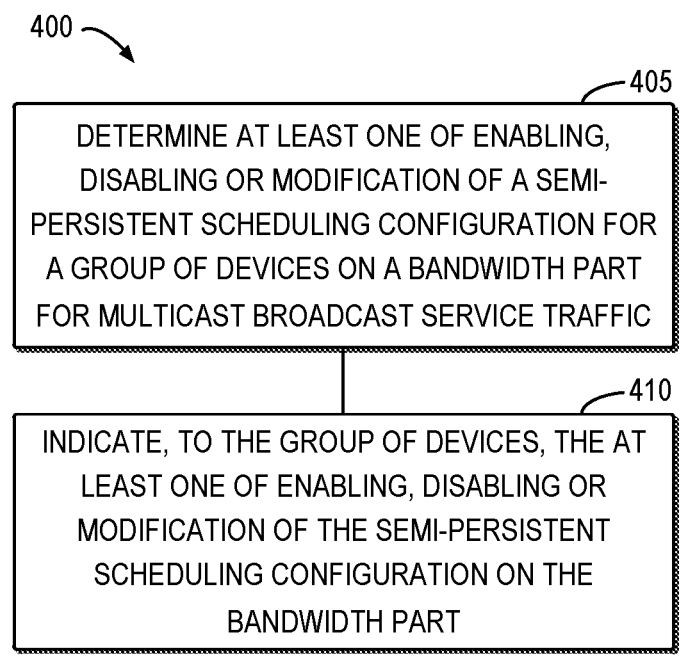
FIG. 4 illustrates a flowchart of an example method according to some example embodiments of the present disclosure.

FIG. 4 shows a flowchart of an example method 400 according to some example embodiments of the present disclosure. The method 400 can be implemented by the network device 305 as shown in FIG. 3 or other devices that can transmit MBS traffic.

At block 405, at least one of enabling, disabling or modification of a SPS configuration is determined for a group of devices such as the terminal devices 310 on a BWP for MBS traffic. At block 410, the enabling, disabling or modification of the SPS configuration is indicated to the group of devices.

In some example embodiments, downlink control information (DCI) may be used to indicate the enabling, disabling or modification of the SPS configuration. For example, the DCI sent using common frequency resources (CFRs) on the BWP may contain an index of a SPS configuration to indicate the enabling of the SPS configuration. Accordingly, if a device obtains the DCI on the CFRs, the device may determine that the CFRs are semi-persistently scheduled and thus the SPS configuration with an index contained in the DCI is enabled for the MBS traffic on the BWP.

As discussed above, resources on the BWP where MBS traffic would be scheduled is called CFRs. The MBS CFRs could be identified at a receiving side in any suitable way that already exists or is to be developed in the future. Currently, the SPS configurations may be provided via RRC for each BWP. Each SPS configuration made for a particular BWP may be identified using an index of the SPS configuration. In some example embodiments, one or more indices of SPS configurations may be provided for the BWP where MBS CFRs are located. Then, the DCI containing an index of a SPS configuration is sent via PDCCH using Control Resource Set (CORESET) that is located within the MBS CFRs to indicate that the SPS configuration is enabled on the MBS CFRs for the MBS traffic.

Based on the current working assumptions in 3GPP RAN1, the GC-PDCCH signaling for GC-PDSCH would be configured within the MBS CFR. So it would be natural to assume that if the SPS activation message is not located within the MBS CFR, the DCI is not related to MBS PDSCH, but rather to the unicast traffic. In some example embodiments, some of the existing SPS configurations may be used or reserved for MBS traffic.

As such, a current or existing SPS configuration made per BWP may be reused for the SPS of MBS. For example, in the scenario where the PDCCH for enabling SPS, scrambled using CS-RNTI, is scheduled using CORESET contained within the MBS CFR, it may be indicated that that the SPS configuration with an index contained in the DCI is related to MBS PDSCH. In other words, if the index of the activated SPS configuration is liked to be related to MBS traffic, it is implied that the PDSCH data would be scrambled by group-common identity (GC-RNTI).

The decision to configure SPS in the MBS BWP would be up to network implementation. In some example embodiments, the possibility that the SPS configuration is used for the MBS traffic on the BWP may be indicated to the receiving party in advance. This could be done by adding a new field or reuse an existing or reserved field within a signaling message such as a radio resource control (RRC) message for informing the SPS configuration.

In some example embodiments, an index of a SPS configuration related to the BWPs for MBS traffic may be mapped to the corresponding group common identity, such as G-RNTI. These SPS configurations need to be synchronized across all the devices receiving the same MBS traffic. For example, for a BWP, a group common identity associated with a SPS configuration may be determined. In some example embodiments, a type of group-common identity may be configured for SPS of MBS. For example, for the use of SPS, a new type of group-common identity, such as group-common configured scheduling —RNTI (GCS-RNTI) may be defined for the BWP where the MBS CFR is scheduled. The configuration of the mapped group-common identity may contain an index of the corresponding SPS configuration.

The association of the group common identity and the SPS configuration may be indicated to the devices that are to receive the MBS traffic. As an example, as part of RRC signaling for G-RNTI configuration, an additional new field is added or an existing or reserved field is reused to indicate an index of the corresponding SPS configuration. In some example embodiments, if the index of the SPS configuration is provided as part of G-RNTI configuration, it means that the SPS configuration is enabled or activated for the MBS traffic.

In some example embodiments, the DCI may be used to indicate the enabling, disabling or modification of the corresponding SPS configuration. For example, there may be new or modified fields included in the DCI to indicate whether the configuration indicated by the DCI is related to dynamic downlink or SPS scheduling of MBS traffic.

If the predefined GCS-RNTI is utilized, the DCI format may be similar to CS-RNTI. For example, the field of Hybrid automatic repeat request (HARM) process identity (ID) may be used to indicate the index of the SPS configuration mapped to the group-common identity for MBS traffic. If the DCI contains a different index of a different SPS configuration, it may be indicated that the SPS configuration for the MBS traffic is disabled or modified.

Depending the specific implementations, the DCI may be scrambled using either dedicated identity such as CS-RNTI or group common identity such as G-RNTI or a specific Group-common configured scheduling-RNTI (GCS-RNTI) predefined for SPS of MBS. In some example embodiments, CS-RNTI, G-RNTI or GCS-RNTI may be used for multicast traffic. For broadcast traffic, G-RNTI or GCS-RNTI may be used. In some example embodiments, if a device is joining or leaving an ongoing multicast session, dedicated identity such as UE-specific CS-RNTI may be used to scramble the DCI to add or remove the device from a group of devices for receiving the MBS traffic, or the device is removed from the group of device.

The linking of the index of the SPS configuration and MBS Traffic may be implicit. For example, initially the SPS configurations for the BWP where MBS CFRs are located may be provided, and then the SPS activation message such as DCI via PDCCH is sent using the CORESET that is located within the MBS CFR. If this implicit linking between SPS configuration index and MBS traffic scheduling is standardized, a new rule needs to be specified in the standards which may be used determine the UE behavior. The rule may be related to which is to link the index of the activated SPS configuration to be related to MBS traffic, which implies that the PDSCH data would be scrambled by group-common identity or GC-RNTI.

Figure 5:
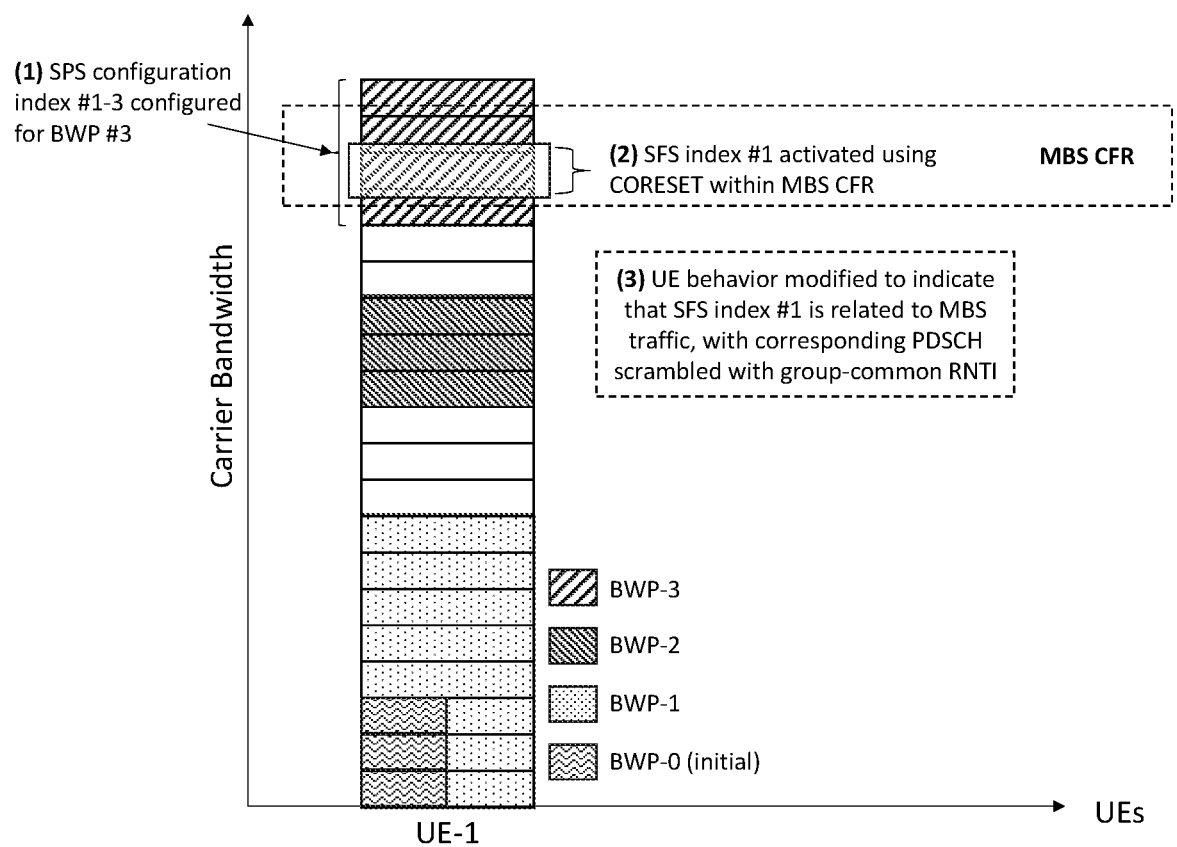
FIG. 5 illustrates example implicit linking of an index of an SPS configuration with MBS traffic.

Example implicit linking of an index of an SPS configuration with MBS traffic will be discussed below with reference to FIG. 5. As shown in FIG. 5, the existing SPS configuration for a BWP is linked to MBS traffic if the SPS activation message such as the DCI containing the index of the SPS configuration is received using the CORESET within the MBS CFR. Explicit rules related to the RNTI used for decoding the SPS activation message may be defined, whereby either CS-RNTI, G-RNTI or GCS-RNTI may be used depending on the configurations made by the network.

In some example embodiments, the SPS configuration for the MBS traffic may be determined as a configuration for group common identity. For example, SPS configurations may be defined as part of G-RNTI configurations. The defined SPS configuration may exclude an index of the SPS configuration since the G-RNTI is generally linked to the BWP where MBS traffic is scheduled.

In some example embodiments, the SPS configuration as the configuration for the group common identity may be broadcast in predefined system information block (SIB). For example, a newly defined SIB may be used to indicate the SPS configuration so that all the receivers can be aware of the SPS configuration. It is also possible to reuse an existing SIB to broadcast the SPS configuration as the configuration for the group common identity.

This SPS configuration may be enabled or activated using a PDCCH scrambled using group common identity such as G-RNTI or GCS-RNTI. For example, the DCI is scrambled using the group common identity to indicate the enabling or activation of the SPS configuration. Either existing DCI formats such as DCI formats 1_x or newly defined DCI formats may be used for signaling this information. Since the index of the SPS configuration index may be not required, the number of SPS configurations for unicast may not be limited, thereby improving the utilization of the SPS configurations for unicast.

In this way, the SPS framework may be incorporated to G-RNTI configurations via RRC signaling, for example. Accordingly, the network would have the flexibility to decide between using dynamic or semi-persistent scheduling for a particular MBS traffic. For example, a static association between G-RNTI and SPS configurations may be defined. In this case, if the G-RNTI configuration is mapped to an SPS configuration, it is assumed that the network always uses the SPS configuration for scheduling the MBS traffic associated with the G-RNTI. The association may also be dynamically changed.

An example SPS configuration will be discussed as below. In this example, the SC-PTM RRC configurations made in Rel-13 (including the G-RNTI) is enhanced to define the SPS configuration for the MBS traffic.

```
SC-MTCH-Info-r13 ::=              SEQUENCE {
    mbmsSessionInfo-r13               MBMSSessionInfo-r13,
    g-RNTI-r13                        BIT STRING(SIZE(16)),
    sc-mtch-schedulingInfo-r13        SC-MTCH-SchedulingInfo-r13
       OPTIONAL,  -- Need OP
    sc-mtch-neighbourCell-r13         BIT STRING
    (SIZE(maxNeighCell-SCPTM-r13))    OPTIONAL,  -- Need OP
    ...,
    [[ p-a-r13                        ENUMERATED {
    dB-1dot77,                            dB-6, dB-4dot77, dB-3,
    dB3}  OPTIONAL   -- Need ON           dB0, dB1, dB2,
    ]]
}
```

In the G-RNTI configurations in the RRC message, the details of the SPS configuration may be appended:
nrofHARQ-Processes: the number of configured HARQ processes for SPS;
harq-ProcID-Offset: Offset of HARQ process for SPS;
periodicity: periodicity of configured downlink assignment for SPS.
Possible GCS-RNTI configurations This would enable the receiver to understand that this particular G-RNTI utilizes SPS rather than dynamic scheduling and reception of GC-PDCCH where cyclic redundancy check (CRC) is scrambled by this particular G-RNTI would imply the activation of the SPS configurations that are provided as part of the G-RNTI RRC configurations.

The different implementation options of the SPS configuration for the MBS traffic may be switched depending on the traffic profile and/or the state of devices receiving a particular MBS traffic. For example, an option may be selected depending on the states of the receiver (for example, in either a connected mode or an idle or inactive mode), unicast traffic received by the receiver, and the type of the MBS traffic (either multicast or broadcast traffic).

In some example embodiments, the indication of the enabling, disabling or modification of an SPS configuration may be received when a device is in a connected mode. When the device enters in an idle or inactive mode, the device may maintain the SPS configuration. The device may continue monitoring PDCCH for possible modifications and/or disabling of the SPS configuration. For example, the device in the idle or inactive mode may monitor the PDCCH based on appropriate CS-RNTI, G-RNTI or GCS-RNTI to receive the SPS activation, modification and deactivation messages.

In some example embodiments, as part of the SPS configuration, the network could also indicate to the MSB receiver whether the SPS configuration is to be used after a transition from a connected mode (such as a RRC connected mode) to an idle or inactive mode. For example, a new flag within the configuration may be used to indicate to the device the validity of the SPS configuration after a transition to an idle or inactive mode.

If a device is receiving only the SPS MBS traffic, the device may transit to the idle or inactive mode. In the idle/active state, the device can maintain the scheduling information received in the connected state and receive the MB S traffic accordingly. The devices receiving multicast traffic may need to monitor CS-RNTI, G-RNTI or GCS-RNTI whereas UEs receiving broadcast traffic would need to monitor only G-RNTI or GCS-RNTI.

Although receive-only mode (ROM) UEs are not supported in 5G or NR in the current release, there is a possibility that the idle or inactive-mode UEs can receive the MBS configuration information after entering the connected state. In case ROM UEs are supported in future releases, the SPS configurations for the connected UE may be directly extended for such UEs as well. The extension may be implemented (a) either using pre-configuration of SPS and related RNTI, or (b) using broadcast signalling of RRC configurations enabling the UE to receive SPS activation, modification and deactivation messages through DCI.

Figure 6:
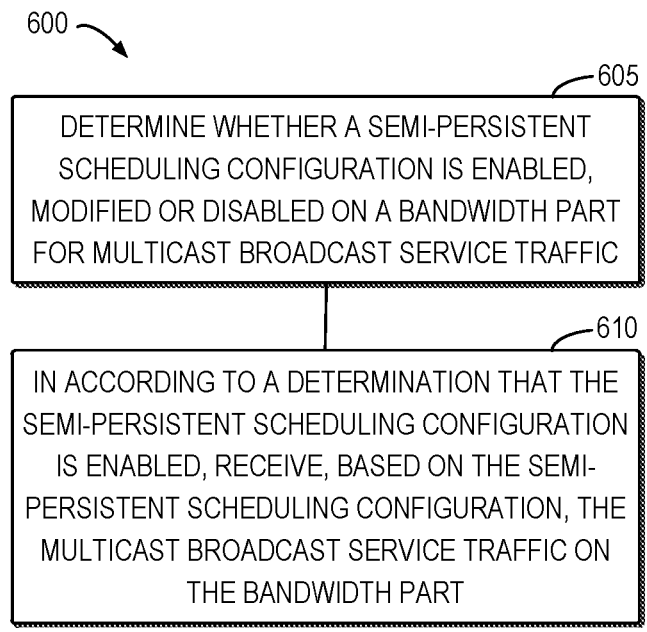
FIG. 6 illustrates a flowchart of an example method according to some other example embodiments of the present disclosure.

FIG. 6 shows a flowchart of an example method 600 according to some example embodiments of the present disclosure. The method 600 can be implemented by the terminal devices 310 as shown in FIG. 3 or other devices that can receive MBS traffic.

At block 605, it is determined whether a SPS configuration is enabled, modified or disabled on a BWP for MBS traffic. In some example embodiments, the enabling, disabling or modification of the SPS configuration may be determined based on DCI. For example, a device may perform blind decoding of DCI on the BWP using the at least one of dedicated identity (such as CS-RNTI) or group common identity (such as G-RNTI or GCS-RNTI). If the DCI is decoded, it may be determined based on the DCI whether the SPS configuration is enabled, modified or disabled. As an example, if the DCI is received on CFRs on the BWP, it may be determined that the SPS configuration is enabled. That is, the CFRs are semi-statically or semi-persistently scheduled.

In some example embodiments, the possibility that the SPS configuration is used for the MBS traffic on the BWP may be received in advance. The possibility may be indicated by a new field or reuse an existing or reserved field within a RRC message for informing the SPS configuration. Accordingly, the UE may be configured with a rule, for example, as part of G-RNTI configurations, to assume that this SPS configuration is related to MBS PDSCH.

In some example embodiments, the association between the SPS configuration and group common identity for the BWP may be predefined or pre-established. Accordingly, the device may determine the enabling, disabling or modification of the SPS configuration based on the association. For example, an index of a SPS configuration related to the BWPs for MBS traffic may be mapped to the corresponding group common identity, such as G-RNTI or GCS-RNTI. If the index of the SPS configuration is provided as part of the G-RNTI configuration, the device may assume that the SPS configuration is enabled or activated using G-RNTI.

In some example embodiments, if a device decodes DCI containing the index of the SPS configuration, the device may determine that the SPS configuration is enabled. If the decoded DCI contains a different index of a different SPS configuration, the device may determine that the SPS configuration is disabled or modified.

As an example, once a device receives CS-RNTI, SPS configurations and G-RNTI with an optional index of the SPS configuration mapped, on the MBS BWP where SPS is configured and linked to G-RNTI, the device may have both options of determine the enabling or activation of the SPS configuration using DCI formats 1_x scrambled by CS-RNTI or G-RNTI. This implies that the device needs to do blind decoding of formats 1_x using either CS-RNTI or G-RNTIs. There may be new or modified or even reused fields included in the DCI to indicate whether the configuration is related to dynamic downlink or SPS scheduling of MBS traffic.

In some example embodiments, one or more SPS configurations may be defined as part of G-RNTI configurations. The SPS configurations may be received in predefined SIB. The enabling or activation of this SPS configuration could be indicated using PDCCH scrambled using G-RNTI or GCS-RNTI. Accordingly, if a UE is configured with this information, the device needs to monitor MBS related DCI formats on the configured monitoring occasions with the CRC of the DCI assumed to be scrambled using G-RNTI or GCS-RNTI. Either DCI formats 1_x or newly defined MBS DCI formats could be used for signaling this information. Further, the device may be expecting appropriate format of the DCI including size estimation, based on the RNTIs configured and depending on whether the device expects dynamic and/or semi-persistent scheduling of the MBS traffic. Once the device receives the DCI, the device may enable or disable the SPS configuration in any suitable procedure that already exists or is to be developed in the future.

If it is determined at block 605 that the SPS configuration is enabled, at block 610, the MBS traffic is received on the bandwidth part based on the SPS configuration. In some example embodiments, the device may determine periodicity of the MBS traffic based on the SPS configuration, and then receive, the MBS traffic using CFRs on the bandwidth part in the periodicity. The detection of the MBS traffic may use dedicated identity such as CS-RNTI or group common identity such as G-RNTI or GCS-RNTI.

Some example embodiments of receiving the MBS traffic will be discussed below with reference to FIGS. 7-9 where a UE acts as a device interest of receiving the MBS traffic and a gNB acts as a device scheduling SPS for the MBS traffic.

Figure 7:
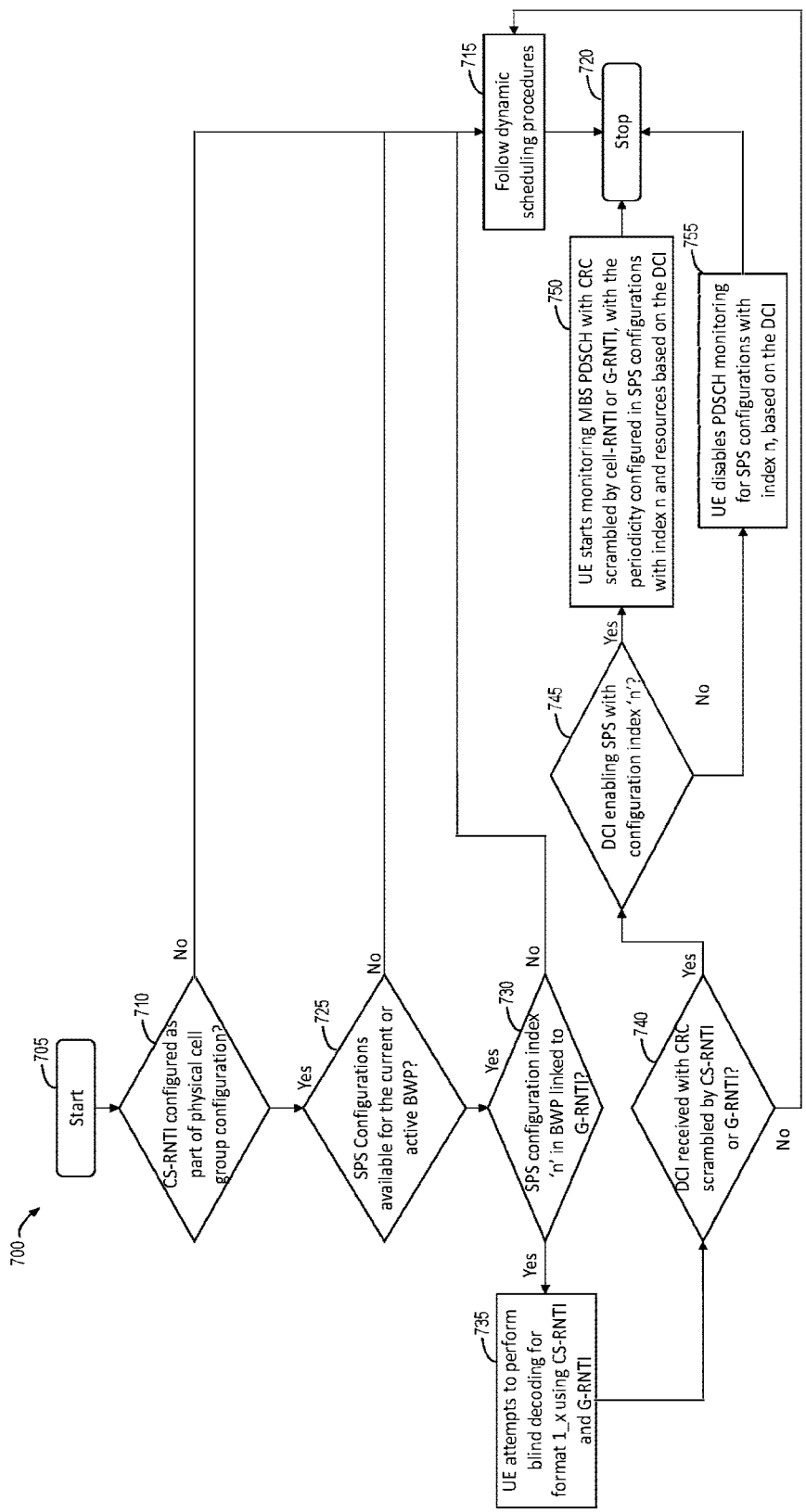
FIG. 7 illustrates an example process of reusing the current SPS framework and configurations for configuring SPS for MBS PDSCH according to some example embodiments of the present disclosure.

FIG. 7 shows an example process 700 of reusing the current SPS framework and configurations for configuring SPS for MBS PDSCH according to some example embodiments of the present disclosure.

As shown in FIG. 7, the process 700 starts at block 705. At block 710, the UE determines whether CS-RNTI is configured as part of physical cell group configuration. If no, the process 700 proceeds to block 715 where the process 700 follows dynamic scheduling procedures, and then the process 700 stops at block 720. If it is determined that CS-RNTI is configured as part of physical cell group configuration at block 710, the process 700 proceeds to block 725 where the UE determines whether SPS configurations are available for the current or active BWP. If no, the process 700 proceeds to block 715 to follow dynamic scheduling procedures. If yes, at block 730, it is determined whether SPS configuration index 'n' in BWP is linked to G-RNTI. If no, the process 700 proceeds to block 715. If yes, at block 735, the UE attempts to perform blind decoding for DCI format 1_x using CS-RNTI and G-RNTI.

Then, at block 740, it is determined whether DCI is received with CRC scrambled by CS-RNTI or G-RNTI. If no, the process 700 follows dynamic scheduling procedures at block 715. If yes, the process 700 proceeds to block 745 where it is determined whether DCI enables SPS with configuration index 'n'. If yes, at block 750, the UE starts monitoring MBS PDSCH with CRC scrambled by cell-RNTI or G-RNTI, with the periodicity configured in SPS configurations with index n and resources based on the DCI. Then, the process 700 stops at block 720. If it is determined that DCI does not enable SPS with configuration index 'n' at block 745, the process 700 proceeds to block 755 where the UE disables PDSCH monitoring for SPS configurations with index n, based on the DCI, and then the process 700 stops at block 720.

If the UE is configured with the CS-RNTI as part of the cell group configurations, for the BWP where the MBS CFR is scheduled by the gNB. A new configuration parameter is proposed as part of the G-RNTI RRC configuration, which is used to map a particular SPS configuration index to the G-RNTI. Based on this mapping, the UE can interpret that the SPS configuration is related to MBS PDSCH— where the PDSCH is scrambled using the group-common identity (such as G-RNTI). The SPS configuration may also be enabled using PDCCH scrambled using group-common identity (such as G-RNTI, also called as GC-PDCCH). If GC-PDCCH is used, it is assumed that the DCI format is modified to indicate to the UE that the DCI is related to SPS activation as compared to dynamic scheduling. Even for the option where the group-common RNTI is used for activating the SPS, it could be beneficial to still have CS-RNTI for UE-specific modifications, especially in the scenario where there are new UEs joining the group.

Figure 8:
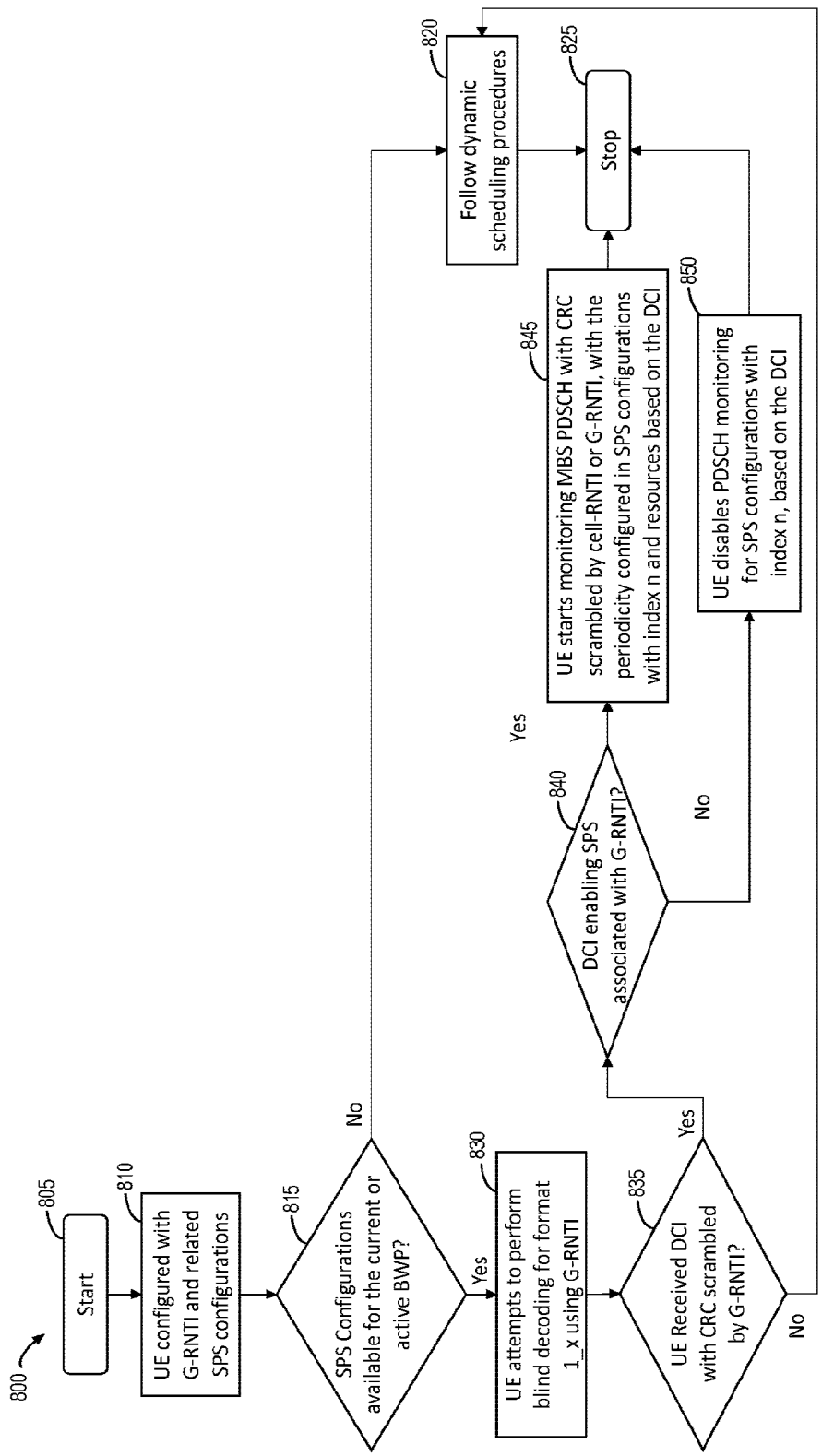
FIG. 8 illustrates an example process based on G-RNTI based semi-persistent scheduling configurations according to some example embodiments of the present disclosure.

FIG. 8 shows an example process 800 based on G-RNTI based semi-persistent scheduling configurations according to some example embodiments of the present disclosure. In the process 800, a static association between G-RNTI and SPS configuration is considered whereby if the G-RNTI is mapped to an SPS configuration it is assumed that the network always uses SPS for scheduling the MBS traffic associated with the G-RNTI.

As shown in FIG. 8, the process 800 starts at block 805. At block 810, the UE is configured with G-RNTI and related SPS configurations. At block 815, it is determined whether SPS configurations are available for the current or active BWP. If no, the process 800 follows dynamic scheduling procedures at block 820, and then stops at block 825. If yes, at block 830, the UE attempts to perform blind decoding for DCI format 1_x using G-RNTI.

Then, at block 835, it is determined whether DCI is received with CRC scrambled by CS-RNTI or G-RNTI. If no, the process 800 proceeds to block 820 to follow dynamic scheduling procedures. If yes, the process 800 proceeds to block 840 where it is determined whether DCI enables SPS associated with G-RNTI. If yes, at block 845, the UE starts monitoring MBS PDSCH with CRC scrambled by cell-RNTI or G-RNTI, with the periodicity configured in SPS configurations with index n and resources based on the DCI. Then, the process 800 stops at block 825. If no, the process 800 proceeds to block 850 where the UE disables PDSCH monitoring for SPS configurations with index n, based on the DCI, and then the process 800 stops at block 825.

Figure 9:
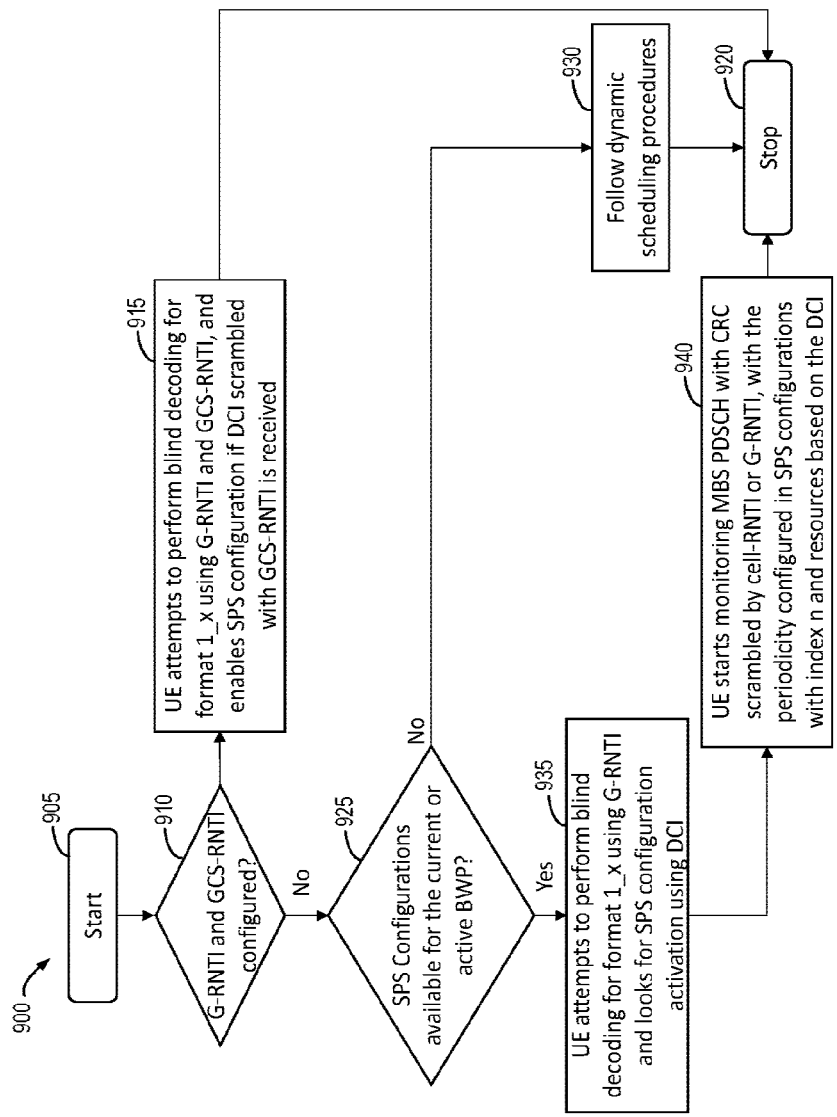
FIG. 9 illustrates an example process of dynamic and semi-persistent scheduling with G-RNTI and GCS-RNTI according to some example embodiments of the present disclosure.

The utilization of GCS-RNTI and G-RNTI for dynamic and semi-persistent scheduling of MBS traffic may follow the process 900 as shown in FIG. 9, where the network can configure both scheduling types based on the RNTI used.

FIG. 9 shows an example process 900 of dynamic and semi-persistent scheduling with G-RNTI and GCS-RNTI according to some example embodiments of the present disclosure.

As shown in FIG. 9, the process 900 starts at block 905. At block 910, it is determined whether G-RNTI and GCS-RNTI are configured. If yes, at block 915, the UE attempts to perform blind decoding for format 1_x using G-RNTI and GCS-RNTI and enables SPS configuration if DCI scrambled with GCS-RNTI is received. Then, the process 900 stops at block 920.

If it is determined at block 910 that G-RNTI and GCS-RNTI are not configured, at block 925, the UE determines whether SPS configurations are available for the current or active BWP. If no, the process 900 follows dynamic scheduling procedures at block 930, and then stops at block 920. If yes, at block 935, the UE attempts to perform blind decoding for format 1_x using G-RNTI and looks for SPS configuration activation using DCI. At block 940, the UE starts monitoring MBS PDSCH with CRC scrambled by cell-RNTI or G-RNTI, with the periodicity configured in SPS configurations with index n and resources based on the DCI. Then, the process 900 stops at block 920.

In some example embodiments, the indication related to the SPC configuration for the MBS traffic is received by the device in a connected mode. For example, the device may receive configurations in a connected mode while maintaining the configurations in an idle or inactive mode. In some example embodiments, the SPS configuration may contain an indication whether the semi-persistent scheduling configuration is to be used after a transition from a connected mode to an idle or inactive mode. For example, the network may indicate to the device—using a new flag within the configuration, whether the semi-persistent scheduling configuration is valid after a transition from a RRC connected mode to an idle or inactive mode if the device is receiving only SPS traffic.

In the idle or inactive mode, the device needs to continue monitoring PDCCH for possible modifications and/or disabling of the SPS configuration. For example, the device may monitor the PDCCH based on appropriate CS-RNTI, G-RNTI or GCS-RNTI to receive the SPS activation, modification and deactivation messages. As an example, if the device is receiving multicast traffic, the device may need to monitor CS-RNTI, G-RNTI or GCS-RNTI. If the device is receiving broadcast traffic, the device may need to monitor only G-RNTI or GCS-RNTI. In some example embodiments, the device may perform blind decoding of DCI on the BWP using CS-RNTI, G-RNTI or GCS-RNTI. If the DCI is decoded, the device may determine whether the SPS configuration is modified or disabled.

Figure 10:
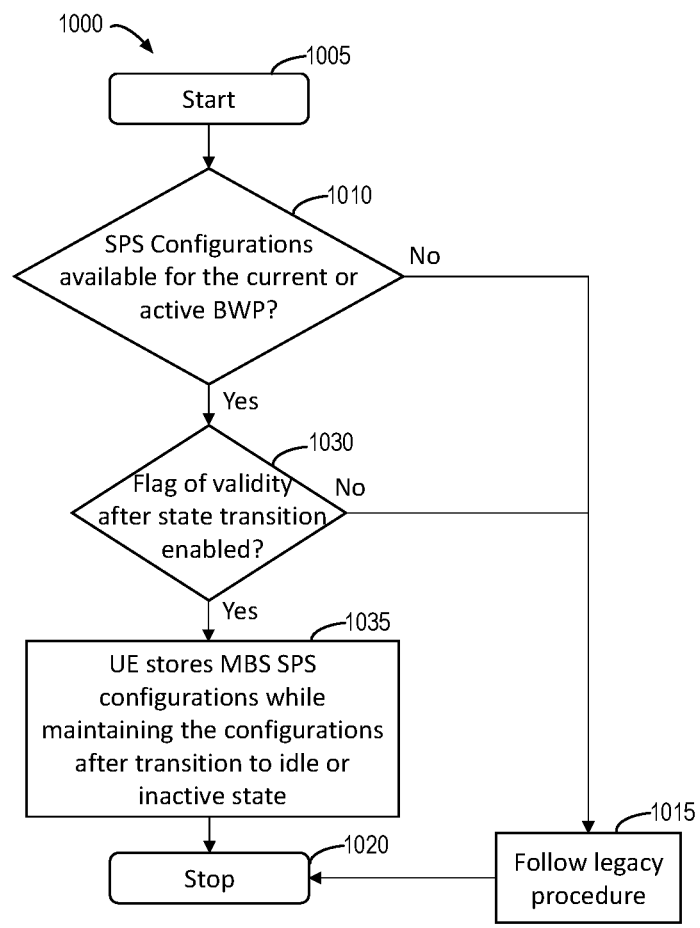
FIG. 10 illustrates an example state transition process according to some example embodiments of the present disclosure.

FIG. 10 shows an example state transition process 1000 according to some example embodiments of the present disclosure. In this example, a UE acts as a device interest of receiving the MBS traffic while a gNB acts as a device scheduling SPS for the MBS traffic.

As shown in FIG. 10, the process 1000 starts at block 1005. At block 1010, it is determined whether SPS configurations are available for the current or active BWP. If no, the process 1000 follows dynamic scheduling procedures at block 1015, and then stops at block 1020. If yes, at block 1030, it is determined whether a flag of validity after a state transition is enabled. If no, the process 1000 follows dynamic scheduling procedures at block 1015. If yes, at block 1035, the UE stores the MBS SPS configurations while maintaining the configurations in an idle or inactive mode. Then, the process 1000 stops at block 1020.

The state transition procedure as shown in FIG. 10 may enable the UE to store the SPS scheduling information received in the connected state. After a transition to the idle or inactive state, the UE can keep receiving MBS traffic using the stored scheduling information.

All operations and features as described above with reference to FIGS. 3-5 are likewise applicable to the method 600 and the processes 700-1000 and have similar effects. For the purpose of simplification, the details will be omitted.

Figure 11:
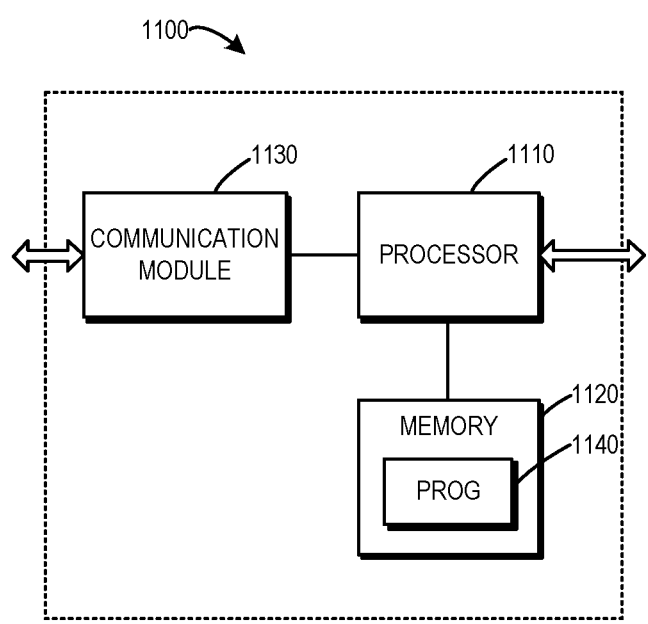
FIG. 11 illustrates a simplified block diagram of a device that is suitable for implementing example embodiments of the present disclosure.

FIG. 11 is a simplified block diagram of a device 1100 that is suitable for implementing example embodiments of the present disclosure. The device 1100 can be implemented at the transmitting party or the receiving party for the MBS traffic. As an example, the device 110 may be performed at or as a part of the network device 305 or the terminal device 310 as shown in FIG. 3.

As shown, the device 1100 includes a processor 1110, a memory 1120 coupled to the processor 1110, a communication module 1130 coupled to the processor 1110, and a communication interface (not shown) coupled to the communication module 1130. The memory 1120 stores at least a program 1140. The communication module 1130 is for bidirectional communications, for example, via multiple antennas. The communication interface may represent any interface that is necessary for communication.

The program 1140 is assumed to include program instructions that, when executed by the associated processor 1110, enable the device 1100 to operate in accordance with the example embodiments of the present disclosure, as discussed herein with reference to FIGS. 3-10. The example embodiments herein may be implemented by computer software executable by the processor 1110 of the device 1100, or by hardware, or by a combination of software and hardware. The processor 1110 may be configured to implement various example embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

When the device 1100 acts as the network device 305 or a part of the network device 305, the processor 1110 and the communication module 1130 may cooperate to implement the method 400 as described above with reference to FIGS. 3-5. When the device 1100 acts as the terminal device 310 or a part of the terminal device 310, the processor 1110 and the communication module 1130 may cooperate to implement the method 600 as described above with reference to FIGS. 6-10. All operations and features as described above with reference to FIGS. 3-10 are likewise applicable to the device 1100 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 600 as described above with reference to FIGS. 3-10. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: determine at least one of enabling, disabling or modification of a semi-persistent scheduling configuration for a group of devices on a bandwidth part for multicast broadcast service traffic; and indicate, to the group of devices, the at least one of enabling, disabling or modification of the semi-persistent scheduling configuration on the bandwidth part.

In some example embodiments, the device is configured to indicate the at least one of enabling, disabling or modification of the semi-persistent scheduling configuration by: sending, to at least a device of the group of devices on the bandwidth, downlink control information to indicate the at least one of enabling, disabling or modification of the semi-persistent scheduling configuration.

In some example embodiments, the device is configured to send the downlink control information to indicate the at least one of enabling, disabling or modification of the semi-persistent scheduling configuration by: sending, using common frequency resources on the bandwidth part, the downlink control information containing an index of the semi-persistent scheduling configuration to indicate the enabling of the semi-persistent scheduling configuration.

In some example embodiments, the multicast broadcast service traffic comprises multicast traffic, and the device is configured to send the downlink control information to indicate the at least one of enabling, disabling or modification of the semi-persistent scheduling configuration by: scrambling the downlink control information using dedicated identity; and sending, to at least the device of the group of devices on the bandwidth, the scrambled downlink control information to indicate the at least one of enabling, disabling or modification of the semi-persistent scheduling configuration.

In some example embodiments, the device is further configured to: send, to the group of devices, an indication of possibility that the semi-persistent scheduling configuration is used for the multicast broadcast service traffic on the bandwidth part.

In some example embodiments, the device is further configured to: determine, for the bandwidth part, a group common identity associated with the semi-persistent scheduling configuration; and indicate, to the device of the group of devices, the association of the group common identity and the semi-persistent scheduling configuration.

In some example embodiments, the group common identity is a type of group common identity configured for semi-persistent scheduling of multicast broadcast service.

In some example embodiments, the device is configured to indicate the association of the group common identity and the semi-persistent scheduling configuration by: sending, to at least the device of the group of devices in a configuration for the group common identity, an index of the semi-persistent scheduling configuration to indicate the association of the group common identity and the semi-persistent scheduling configuration.

In some example embodiments, the device is configured to send the downlink control information to indicate the at least one of enabling, disabling or modification of the semi-persistent scheduling configuration by: sending, to at least the device of the group of devices on the bandwidth, the downlink control information containing the index of the semi-persistent scheduling configuration to indicate the enabling of the semi-persistent scheduling configuration.

In some example embodiments, the device is configured to send the downlink control information to indicate the at least one of enabling, disabling or modification of the semi-persistent scheduling configuration by: sending, to at least the device of the group of devices on the bandwidth, the downlink control information containing a different index of a different semi-persistent scheduling configuration to indicate the disabling or modification of the semi-persistent scheduling configuration.

In some example embodiments, the device is configured to determine the group common identity associated with the semi-persistent scheduling configuration by: determining the semi-persistent scheduling configuration as a configuration for the group common identity.

In some example embodiments, the device is configured to indicate the association of the group common identity and the semi-persistent scheduling configuration by: broadcasting, to the group of devices, the semi-persistent scheduling configuration as the configuration for the group common identity in predefined system information block.

In some example embodiments, the device is configured to send the downlink control information to indicate the at least one of enabling, disabling or modification of the semi-persistent scheduling configuration by: scrambling the downlink control information using the group common identity; and sending, to at least the device of the group of devices on the bandwidth, the scrambled downlink control information to indicate the enabling of the semi-persistent scheduling configuration.

In some example embodiments, the semi-persistent scheduling configuration contains an indication for transition from a connected mode to an idle or inactive mode.

In some aspects, a device comprises: at least one processor; and at least one memory including computer program code; the at least one memory and the computer program code configured to, with the at least one processor, cause the device to: determine whether a semi-persistent scheduling configuration is enabled, modified or disabled on a bandwidth part for multicast broadcast service traffic; and in according to a determination that the semi-persistent scheduling configuration is enabled, receive, based on the semi-persistent scheduling configuration, the multicast broadcast service traffic on the bandwidth part.

In some example embodiments, the device is configured to determine whether the semi-persistent scheduling configuration is enabled, modified or disabled by: performing blind decoding of downlink control information on the bandwidth part using the at least one of dedicated identity or group common identity; and in response to the downlink control information being decoded, determining, based on the downlink control information, whether the semi-persistent scheduling configuration is enabled, modified or disabled.

In some example embodiments, the device is configured to determine, based on the downlink control information, whether the semi-persistent scheduling configuration is enabled, modified or disabled by: in response to the downlink control information being received on common frequency resources on the bandwidth part, determining that the semi-persistent scheduling configuration is enabled.

In some example embodiments, the device is further configured to: receive an indication of possibility that the semi-persistent scheduling configuration is used for the multicast broadcast service traffic on the bandwidth part.

In some example embodiments, the device is further configured to: receive an indication of association between the group common identity for the bandwidth part and the semi-persistent scheduling configuration.

In some example embodiments, the group common identity is a type of group common identity configured for semi-persistent scheduling of multicast broadcast service.

In some example embodiments, the device is configured to receive the indication of the association between the group common identity and the semi-persistent scheduling configuration by: receiving, in a configuration for the group common identity, an index of the semi-persistent scheduling configuration.

In some example embodiments, the device is configured to determine, based on the downlink control information, whether the semi-persistent scheduling configuration is enabled, modified or disabled by: in response to the decoded downlink control information containing the index of the semi-persistent scheduling configuration, determining that the semi-persistent scheduling configuration is enabled.

In some example embodiments, the device is configured to determine, based on the downlink control information, whether the semi-persistent scheduling configuration is enabled, modified or disabled by: in response to the decoded downlink control information containing a different index of a different semi-persistent scheduling configuration, determining that the semi-persistent scheduling configuration is disabled or modified.

In some example embodiments, the device is configured to receive the indication of the association between the group common identity and the semi-persistent scheduling configuration by: receiving the semi-persistent scheduling configuration as the configuration for the group common identity in predefined system information block.

In some example embodiments, the device is configured to determine, based on the downlink control information, whether the semi-persistent scheduling configuration is enabled, modified or disabled by: in response to the downlink control information being decoded using the group common identity, determining that the semi-persistent scheduling configuration is enabled.

In some example embodiments, the semi-persistent scheduling configuration contains an indication for transition from a connected mode to an idle or inactive mode.

In some example embodiments, the device is configured to receive the multicast broadcast service traffic on the bandwidth part by: determining, based on the semi-persistent scheduling configuration, periodicity of the multicast broadcast service traffic; and receiving, in the periodicity, the multicast broadcast service traffic using common frequency resources on the bandwidth part.

In some example embodiments, the device is configured to receive the multicast broadcast service traffic using the common frequency resources on the bandwidth part by: detecting, in the periodicity, using at least one of dedicated identity or group common identity, the multicast broadcast service traffic using the common frequency resources on the bandwidth part.

In some example embodiments, the device is in a connected mode.

In some example embodiments, the device is further configured to, in an idle or inactive mode: perform blind decoding of downlink control information on the bandwidth part using the at least one of dedicated identity or group common identity; and in response to the downlink control information being decoded, determine, based on the downlink control information, whether the semi-persistent scheduling configuration is modified or disabled.

In some aspects, a method comprises: determining at least one of enabling, disabling or modification of a semi-persistent scheduling configuration for a group of devices on a bandwidth part for multicast broadcast service traffic; and indicating, to the group of devices, the at least one of enabling, disabling or modification of the semi-persistent scheduling configuration on the bandwidth part.

In some example embodiments, indicating the at least one of enabling, disabling or modification of the semi-persistent scheduling configuration comprises: sending, to at least a device of the group of devices on the bandwidth, downlink control information to indicate the at least one of enabling, disabling or modification of the semi-persistent scheduling configuration.

In some example embodiments, sending the downlink control information to indicate the at least one of enabling, disabling or modification of the semi-persistent scheduling configuration comprises: sending, using common frequency resources on the bandwidth part, the downlink control information containing an index of the semi-persistent scheduling configuration to indicate the enabling of the semi-persistent scheduling configuration.

In some example embodiments, the multicast broadcast service traffic comprises multicast traffic, and sending the downlink control information to indicate the at least one of enabling, disabling or modification of the semi-persistent scheduling configuration comprises: scrambling the downlink control information using dedicated identity; and sending, to at least the device of the group of devices on the bandwidth, the scrambled downlink control information to indicate the at least one of enabling, disabling or modification of the semi-persistent scheduling configuration.

In some example embodiments, the method further comprises: sending, to the group of devices, an indication of possibility that the semi-persistent scheduling configuration is used for the multicast broadcast service traffic on the bandwidth part.

In some example embodiments, the method further comprises: determining, for the bandwidth part, a group common identity associated with the semi-persistent scheduling configuration; and indicating, to the device of the group of devices, the association of the group common identity and the semi-persistent scheduling configuration.

In some example embodiments, the group common identity is a type of group common identity configured for semi-persistent scheduling of multicast broadcast service.

In some example embodiments, indicating the association of the group common identity and the semi-persistent scheduling configuration comprises: sending, to at least the device of the group of devices in a configuration for the group common identity, an index of the semi-persistent scheduling configuration to indicate the association of the group common identity and the semi-persistent scheduling configuration.

In some example embodiments, sending the downlink control information to indicate the at least one of enabling, disabling or modification of the semi-persistent scheduling configuration comprises: sending, to at least the device of the group of devices on the bandwidth, the downlink control information containing the index of the semi-persistent scheduling configuration to indicate the enabling of the semi-persistent scheduling configuration.

In some example embodiments, sending the downlink control information to indicate the at least one of enabling, disabling or modification of the semi-persistent scheduling configuration comprises: sending, to at least the device of the group of devices on the bandwidth, the downlink control information containing a different index of a different semi-persistent scheduling configuration to indicate the disabling or modification of the semi-persistent scheduling configuration.

In some example embodiments, determining the group common identity associated with the semi-persistent scheduling configuration comprises: determining the semi-persistent scheduling configuration as a configuration for the group common identity.

In some example embodiments, indicating the association of the group common identity and the semi-persistent scheduling configuration comprises: broadcasting, to the group of devices, the semi-persistent scheduling configuration as the configuration for the group common identity in predefined system information block.

In some example embodiments, sending the downlink control information to indicate the at least one of enabling, disabling or modification of the semi-persistent scheduling configuration comprises: scrambling the downlink control information using the group common identity; and sending, to at least the device of the group of devices on the bandwidth, the scrambled downlink control information to indicate the enabling of the semi-persistent scheduling configuration.

In some example embodiments, the semi-persistent scheduling configuration contains an indication for transition from a connected mode to an idle or inactive mode.

In some aspects, a method comprises: determining whether a semi-persistent scheduling configuration is enabled, modified or disabled on a bandwidth part for multicast broadcast service traffic; and in according to a determination that the semi-persistent scheduling configuration is enabled, receiving, based on the semi-persistent scheduling configuration, the multicast broadcast service traffic on the bandwidth part.

In some example embodiments, determining whether the semi-persistent scheduling configuration is enabled, modified or disabled comprises: performing blind decoding of downlink control information on the bandwidth part using the at least one of dedicated identity or group common identity; and in response to the downlink control information being decoded, determining, based on the downlink control information, whether the semi-persistent scheduling configuration is enabled, modified or disabled.

In some example embodiments, determining, based on the downlink control information, whether the semi-persistent scheduling configuration is enabled, modified or disabled comprises: in response to the downlink control information being received on common frequency resources on the bandwidth part, determining that the semi-persistent scheduling configuration is enabled.

In some example embodiments, the method further comprises: receiving an indication of possibility that the semi-persistent scheduling configuration is used for the multicast broadcast service traffic on the bandwidth part.

In some example embodiments, the method further comprises: receiving an indication of association between the group common identity for the bandwidth part and the semi-persistent scheduling configuration.

In some example embodiments, the group common identity is a type of group common identity configured for semi-persistent scheduling of multicast broadcast service.

In some example embodiments, receiving the indication of the association between the group common identity and the semi-persistent scheduling configuration comprises: receiving, in a configuration for the group common identity, an index of the semi-persistent scheduling configuration.

In some example embodiments, determining, based on the downlink control information, whether the semi-persistent scheduling configuration is enabled, modified or disabled comprises: in response to the decoded downlink control information containing the index of the semi-persistent scheduling configuration, determining that the semi-persistent scheduling configuration is enabled.

In some example embodiments, determining, based on the downlink control information, whether the semi-persistent scheduling configuration is enabled, modified or disabled comprises: in response to the decoded downlink control information containing a different index of a different semi-persistent scheduling configuration, determining that the semi-persistent scheduling configuration is disabled or modified.

In some example embodiments, receiving the indication of the association between the group common identity and the semi-persistent scheduling configuration comprises: receiving the semi-persistent scheduling configuration as the configuration for the group common identity in predefined system information block.

In some example embodiments, determining, based on the downlink control information, whether the semi-persistent scheduling configuration is enabled, modified or disabled comprises: in response to the downlink control information being decoded using the group common identity, determining that the semi-persistent scheduling configuration is enabled.

In some example embodiments, the semi-persistent scheduling configuration contains an indication for transition from a connected mode to an idle or inactive mode.

In some example embodiments, receiving the multicast broadcast service traffic on the bandwidth part comprises: determining, based on the semi-persistent scheduling configuration, periodicity of the multicast broadcast service traffic; and receiving, in the periodicity, the multicast broadcast service traffic using common frequency resources on the bandwidth part.

In some example embodiments, receiving the multicast broadcast service traffic using the common frequency resources on the bandwidth part comprises: detecting, in the periodicity, using at least one of dedicated identity or group common identity, the multicast broadcast service traffic using the common frequency resources on the bandwidth part.

In some example embodiments, the method is implemented by a device in a connected mode.

In some example embodiments, the method further comprises, in an idle or inactive mode: performing blind decoding of downlink control information on the bandwidth part using the at least one of dedicated identity or group common identity; and in response to the downlink control information being decoded, determining, based on the downlink control information, whether the semi-persistent scheduling configuration is modified or disabled.

In some aspects, an apparatus comprises: means for determining at least one of enabling, disabling or modification of a semi-persistent scheduling configuration for a group of devices on a bandwidth part for multicast broadcast service traffic; and means for indicating, to the group of devices, the at least one of enabling, disabling or modification of the semi-persistent scheduling configuration on the bandwidth part.

In some example embodiments, the means for indicating the at least one of enabling, disabling or modification of the semi-persistent scheduling configuration comprises: means for sending, to at least a device of the group of devices on the bandwidth, downlink control information to indicate the at least one of enabling, disabling or modification of the semi-persistent scheduling configuration.

In some example embodiments, the means for sending the downlink control information to indicate the at least one of enabling, disabling or modification of the semi-persistent scheduling configuration comprises: means for sending, using common frequency resources on the bandwidth part, the downlink control information containing an index of the semi-persistent scheduling configuration to indicate the enabling of the semi-persistent scheduling configuration.

In some example embodiments, the multicast broadcast service traffic comprises multicast traffic, and the means for sending the downlink control information to indicate the at least one of enabling, disabling or modification of the semi-persistent scheduling configuration comprises: means for scrambling the downlink control information using dedicated identity; and means for sending, to at least the device of the group of devices on the bandwidth, the scrambled downlink control information to indicate the at least one of enabling, disabling or modification of the semi-persistent scheduling configuration.

In some example embodiments, the apparatus further comprises: means for sending, to the group of devices, an indication of possibility that the semi-persistent scheduling configuration is used for the multicast broadcast service traffic on the bandwidth part.

In some example embodiments, the apparatus further comprises: means for determining, for the bandwidth part, a group common identity associated with the semi-persistent scheduling configuration; and means for indicating, to the device of the group of devices, the association of the group common identity and the semi-persistent scheduling configuration.

In some example embodiments, the group common identity is a type of group common identity configured for semi-persistent scheduling of multicast broadcast service.

In some example embodiments, the means for indicating the association of the group common identity and the semi-persistent scheduling configuration comprises: means for sending, to at least the device of the group of devices in a configuration for the group common identity, an index of the semi-persistent scheduling configuration to indicate the association of the group common identity and the semi-persistent scheduling configuration.

In some example embodiments, the means for sending the downlink control information to indicate the at least one of enabling, disabling or modification of the semi-persistent scheduling configuration comprises: means for sending, to at least the device of the group of devices on the bandwidth, the downlink control information containing the index of the semi-persistent scheduling configuration to indicate the enabling of the semi-persistent scheduling configuration.

In some example embodiments, the means for sending the downlink control information to indicate the at least one of enabling, disabling or modification of the semi-persistent scheduling configuration comprises: means for sending, to at least the device of the group of devices on the bandwidth, the downlink control information containing a different index of a different semi-persistent scheduling configuration to indicate the disabling or modification of the semi-persistent scheduling configuration.

In some example embodiments, the means for determining the group common identity associated with the semi-persistent scheduling configuration comprises: means for determining the semi-persistent scheduling configuration as a configuration for the group common identity.

In some example embodiments, the means for indicating the association of the group common identity and the semi-persistent scheduling configuration comprises: means for broadcasting, to the group of devices, the semi-persistent scheduling configuration as the configuration for the group common identity in predefined system information block.

In some example embodiments, the means for sending the downlink control information to indicate the at least one of enabling, disabling or modification of the semi-persistent scheduling configuration comprises: means for scrambling the downlink control information using the group common identity; and means for sending, to at least the device of the group of devices on the bandwidth, the scrambled downlink control information to indicate the enabling of the semi-persistent scheduling configuration.

In some example embodiments, the semi-persistent scheduling configuration contains an indication for transition from a connected mode to an idle or inactive mode.

In some aspects, an apparatus comprises: means for determining whether a semi-persistent scheduling configuration is enabled, modified or disabled on a bandwidth part for multicast broadcast service traffic; and means for in according to a determination that the semi-persistent scheduling configuration is enabled, receiving, based on the semi-persistent scheduling configuration, the multicast broadcast service traffic on the bandwidth part.

In some example embodiments, the means for determining whether the semi-persistent scheduling configuration is enabled, modified or disabled comprises: means for performing blind decoding of downlink control information on the bandwidth part using the at least one of dedicated identity or group common identity; and means for in response to the downlink control information being decoded, determining, based on the downlink control information, whether the semi-persistent scheduling configuration is enabled, modified or disabled.

In some example embodiments, the means for determining, based on the downlink control information, whether the semi-persistent scheduling configuration is enabled, modified or disabled comprises: means for in response to the downlink control information being received on common frequency resources on the bandwidth part, determining that the semi-persistent scheduling configuration is enabled.

In some example embodiments, the apparatus further comprises: means for receiving an indication of possibility that the semi-persistent scheduling configuration is used for the multicast broadcast service traffic on the bandwidth part.

In some example embodiments, the apparatus further comprises: means for receiving an indication of association between the group common identity for the bandwidth part and the semi-persistent scheduling configuration.

In some example embodiments, the group common identity is a type of group common identity configured for semi-persistent scheduling of multicast broadcast service.

In some example embodiments, the means for receiving the indication of the association between the group common identity and the semi-persistent scheduling configuration comprises: means for receiving, in a configuration for the group common identity, an index of the semi-persistent scheduling configuration.

In some example embodiments, the means for determining, based on the downlink control information, whether the semi-persistent scheduling configuration is enabled, modified or disabled comprises: means for in response to the decoded downlink control information containing the index of the semi-persistent scheduling configuration, determining that the semi-persistent scheduling configuration is enabled.

In some example embodiments, the means for determining, based on the downlink control information, whether the semi-persistent scheduling configuration is enabled, modified or disabled comprises: means for in response to the decoded downlink control information containing a different index of a different semi-persistent scheduling configuration, determining that the semi-persistent scheduling configuration is disabled or modified.

In some example embodiments, the means for receiving the indication of the association between the group common identity and the semi-persistent scheduling configuration comprises: means for receiving the semi-persistent scheduling configuration as the configuration for the group common identity in predefined system information block.

In some example embodiments, the means for determining, based on the downlink control information, whether the semi-persistent scheduling configuration is enabled, modified or disabled comprises: means for in response to the downlink control information being decoded using the group common identity, determining that the semi-persistent scheduling configuration is enabled.

In some example embodiments, the semi-persistent scheduling configuration contains an indication for transition from a connected mode to an idle or inactive mode.

In some example embodiments, the means for receiving the multicast broadcast service traffic on the bandwidth part comprises: means for determining, based on the semi-persistent scheduling configuration, periodicity of the multicast broadcast service traffic; and means for receiving, in the periodicity, the multicast broadcast service traffic using common frequency resources on the bandwidth part.

In some example embodiments, the means for receiving the multicast broadcast service traffic using the common frequency resources on the bandwidth part comprises: means for detecting, in the periodicity, using at least one of dedicated identity or group common identity, the multicast broadcast service traffic using the common frequency resources on the bandwidth part.

In some example embodiments, the apparatus is implemented by a device in a connected mode.

In some example embodiments, the apparatus further comprises, in an idle or inactive mode: means for performing blind decoding of downlink control information on the bandwidth part using the at least one of dedicated identity or group common identity; and means for in response to the downlink control information being decoded, determining, based on the downlink control information, whether the semi-persistent scheduling configuration is modified or disabled.

In some aspects, a computer readable storage medium comprises program instructions stored thereon, the instructions, when executed by a processor of a device, causing the device to perform the method according to some example embodiments of the present disclosure.

What is claimed is:

1. A device, comprising:
at least one processor; and
at least one memory storing instructions that, when executed with the at least one processor, cause the device at least to:
determine at least one of enabling, disabling or modification of a semi-persistent scheduling configuration for a group of devices on a bandwidth part for multicast broadcast service traffic; and
indicate, to the group of devices, the at least one of enabling, disabling or modification of the semi-persistent scheduling configuration on the bandwidth part, comprising causing the device to:
send, using common frequency resources on the bandwidth part, to at least a device of the group of devices, downlink control information to indicate the at least one of enabling, disabling or modification of the semi-persistent scheduling configuration, wherein the downlink control information contains an index of the semi-persistent scheduling configuration to indicate the enabling of the semi-persistent scheduling configuration.

2. The device of claim 1, wherein the multicast broadcast service traffic comprises multicast traffic, and sending the downlink control information to indicate the at least one of enabling, disabling or modification of the semi-persistent scheduling configuration comprises the instructions, when executed with the at least one processor, cause the device to:
   scramble the downlink control information using a dedicated identity; and
   send, to at least the device of the group of devices on the bandwidth part, the scrambled downlink control information to indicate the at least one of enabling, disabling or modification of the semi-persistent scheduling configuration.

3. The device of claim 1, wherein the instructions, when executed with the at least one processor, cause the device to:
   determine, for the bandwidth part, a group common identity associated with the semi-persistent scheduling configuration; and
   indicate, to the device of the group of devices, an association of the group common identity and the semi-persistent scheduling configuration.

4. The device of claim 3, wherein indicating the association of the group common identity and the semi-persistent scheduling configuration comprises the instructions, when executed with the at least one processor, cause the device to:
   send, to at least the device of the group of devices in a configuration for the group common identity, the index of the semi-persistent scheduling configuration to indicate the association of the group common identity and the semi-persistent scheduling configuration.

5. The device of claim 1, wherein sending the downlink control information to indicate the at least one of enabling, disabling or modification of the semi-persistent scheduling configuration comprises the instructions, when executed with the at least one processor, cause the device to:
   send, to at least the device of the group of devices on the bandwidth, the downlink control information containing a different index of a different semi-persistent scheduling configuration to indicate the disabling or modification of the semi-persistent scheduling configuration.

6. The device of claim 1, wherein the instructions, when executed with the at least one processor, cause the device to:
   send, to the group of devices, an indication of possibility that the semi-persistent scheduling configuration is used for the multicast broadcast service traffic on the bandwidth part.

7. A device, comprising:
   at least one processor; and
   at least one memory storing instructions that, when executed with the at least one processor, cause the device to:
      receive, in common frequency resources on a bandwidth part for multicast broadcast service traffic, downlink control information indicating at least one of enabling, disabling or modification of a semi-persistent scheduling configuration on the bandwidth part for the multicast broadcast service traffic, wherein the downlink control information contains an index of the semi-persistent scheduling configuration indicating the enabling of the semi-persistent scheduling configuration;
      determine whether the semi-persistent scheduling configuration is enabled, modified or disabled on the bandwidth part for the multicast broadcast service traffic; and
      in accordance with a determination that the semi-persistent scheduling configuration is enabled, receive, based on the semi-persistent scheduling configuration, the multicast broadcast service traffic on the bandwidth part.

8. The device of claim 7, wherein the device is caused to determine determining whether the semipersistent scheduling configuration is enabled, modified or disabled comprises the instructions, when executed with the at least one processor, cause the device to:
   perform blind decoding of the downlink control information on the bandwidth part using at least one of dedicated identity or group common identity; and
   in response to the downlink control information being decoded, determine, based on the downlink control information, whether the semi-persistent scheduling configuration is enabled, modified or disabled.

9. The device of claim 7, wherein the instructions, when executed with the at least one processor, cause the device to:
   receive an indication of association between a group common identity for the bandwidth part and the semi-persistent scheduling configuration.

10. The device of claim 9, wherein receiving the indication of the association between the group common identity and the semi-persistent scheduling configuration comprises the instructions, when executed with the at least one processor, cause the device to:
    receive, in a configuration for the group common identity, the index of the semi-persistent scheduling configuration.

11. The device of claim 7, wherein determining whether the semipersistent scheduling configuration is enabled, modified or disabled comprises the instructions, when executed with the at least one processor, cause the device to:
    in response to the decoded downlink control information containing the index of the semipersistent scheduling configuration, determine that the semi-persistent scheduling configuration is enabled.

12. The device of claim 7, wherein determining whether the semipersistent scheduling configuration is enabled, modified or disabled comprises the instructions, when executed with the at least one processor, cause the device to:
    in response to the decoded downlink control information containing a different index of a different semi-persistent scheduling configuration, determine that the semi-persistent scheduling configuration is disabled or modified.

13. The device of claim 9, wherein receiving the indication of the association between the group common identity and the semi-persistent scheduling configuration comprises the instructions, when executed with the at least one processor, cause the device to:
    receive the semi-persistent scheduling configuration as a configuration for the group common identity in a predefined system information block.

14. The device of claim 7, wherein the instructions, when executed with the at least one processor, cause the device to:
    receive an indication of possibility that the semi-persistent scheduling configuration is used for the multicast broadcast service traffic on the bandwidth part.

15. A method comprising:
receiving, in common frequency resources on a bandwidth part for multicast broadcast service traffic, downlink control information indicating at least one of enabling, disabling or modification of a semi-persistent scheduling configuration on the bandwidth part for the multicast broadcast service traffic, wherein the downlink control information contains an index of the semi-persistent scheduling configuration indicating the enabling of the semi-persistent scheduling configuration;
determining whether the semi-persistent scheduling configuration is enabled, modified or disabled on the bandwidth part for the multicast broadcast service traffic; and
in accordance with a determination that the semi-persistent scheduling configuration is enabled, receiving, based on the semi-persistent scheduling configuration, the multicast broadcast service traffic on the bandwidth part.

16. The method of claim 15, wherein the determining whether the semipersistent scheduling configuration is enabled, modified or disabled comprises:
performing blind decoding of the downlink control information on the bandwidth part using at least one of dedicated identity or group common identity; and
in response to the downlink control information being decoded, determining, based on the downlink control information, whether the semi-persistent scheduling configuration is enabled, modified or disabled.

17. The method of claim 15, further comprising:
receiving an indication of association between a group common identity for the bandwidth part and the semi-persistent scheduling configuration.

18. The method of claim 17, wherein the receiving of the indication of the association between the group common identity and the semi-persistent scheduling configuration comprises:
receiving, in a configuration for the group common identity, the index of the semi-persistent scheduling configuration.

19. The method of claim 15, wherein the determining of whether the semipersistent scheduling configuration is enabled, modified or disabled comprises:
in response to the decoded downlink control information containing the index of the semipersistent scheduling configuration, determining that the semi-persistent scheduling configuration is enabled.

20. The method of claim 15, wherein the determining of whether the semipersistent scheduling configuration is enabled, modified or disabled comprises:
in response to the decoded downlink control information containing a different index of a different semi-persistent scheduling configuration, determining that the semi-persistent scheduling configuration is disabled or modified.

* * * * *